United States Patent [19]

Glover

[11] 4,329,112
[45] May 11, 1982

[54] TRANSFER APPARATUS FOR PATTERN-CHANGING MECHANISM

[75] Inventor: Charles G. Glover, Cincinnati, Ohio

[73] Assignee: The Lodge & Shipley Company, Cincinnati, Ohio

[21] Appl. No.: 30,281

[22] Filed: Apr. 16, 1979

[51] Int. Cl.³ ............................................. B65G 47/91
[52] U.S. Cl. .................................. 414/751; 198/434; 414/752; 414/416; 414/754; 414/783
[58] Field of Search .................. 414/59, 61, 120, 121, 414/754, 773, 783, 623, 627, 733, 736, 751, 752, 753, 416; 198/432, 433, 434, 486; 53/543, 544

[56] References Cited

U.S. PATENT DOCUMENTS 2,903,290 9/1959 Morris et al. .................. 414/416 X
3,300,945 1/1967 Grossi et al. ..................... 414/133 X
3,448,865 6/1969 Schroeder ....................... 414/751 X
3,598,221 8/1971 Kumaschka ..................... 198/432 X
4,164,296 8/1979 Trees ................................ 414/416

Primary Examiner—Frank E. Werner
Attorney, Agent, or Firm—Wood, Herron & Evans

[57] ABSTRACT

Apparatus for removing bottles from a case wherein the bottles are in a 3×4 pattern and depositing the bottles in a 2×6 pattern on a conveyor. The apparatus includes a center carriage having a 2×3 pattern of lifting devices and two outboard carriages having 1×3 patterns of lifting devices with mechanism for moving the outboard carriages toward each other as the center carriage is moved longitudinally with respect to the outboard carriages, thereby converting a 3×4 pattern to a 2×6 pattern.

5 Claims, 10 Drawing Figures

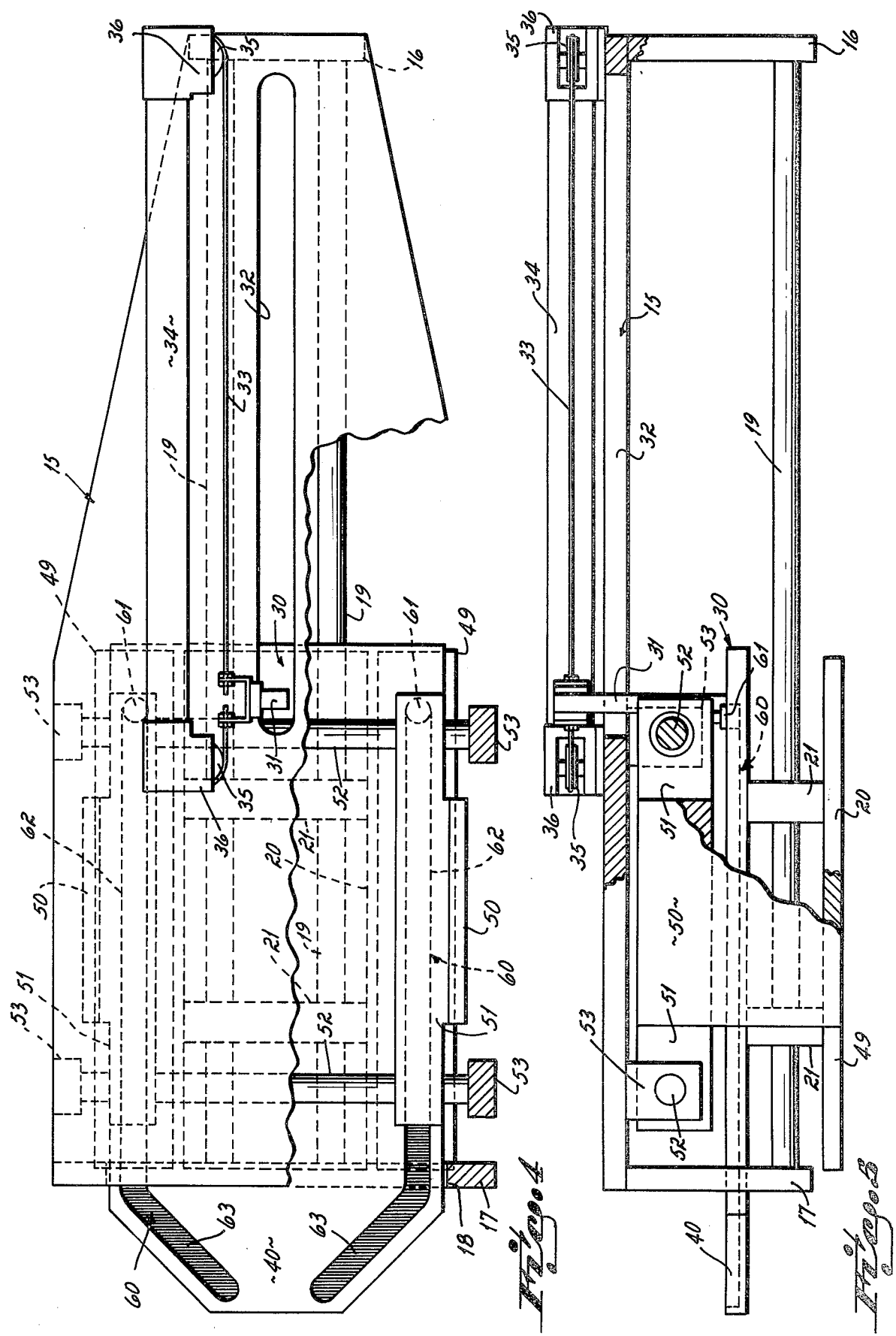

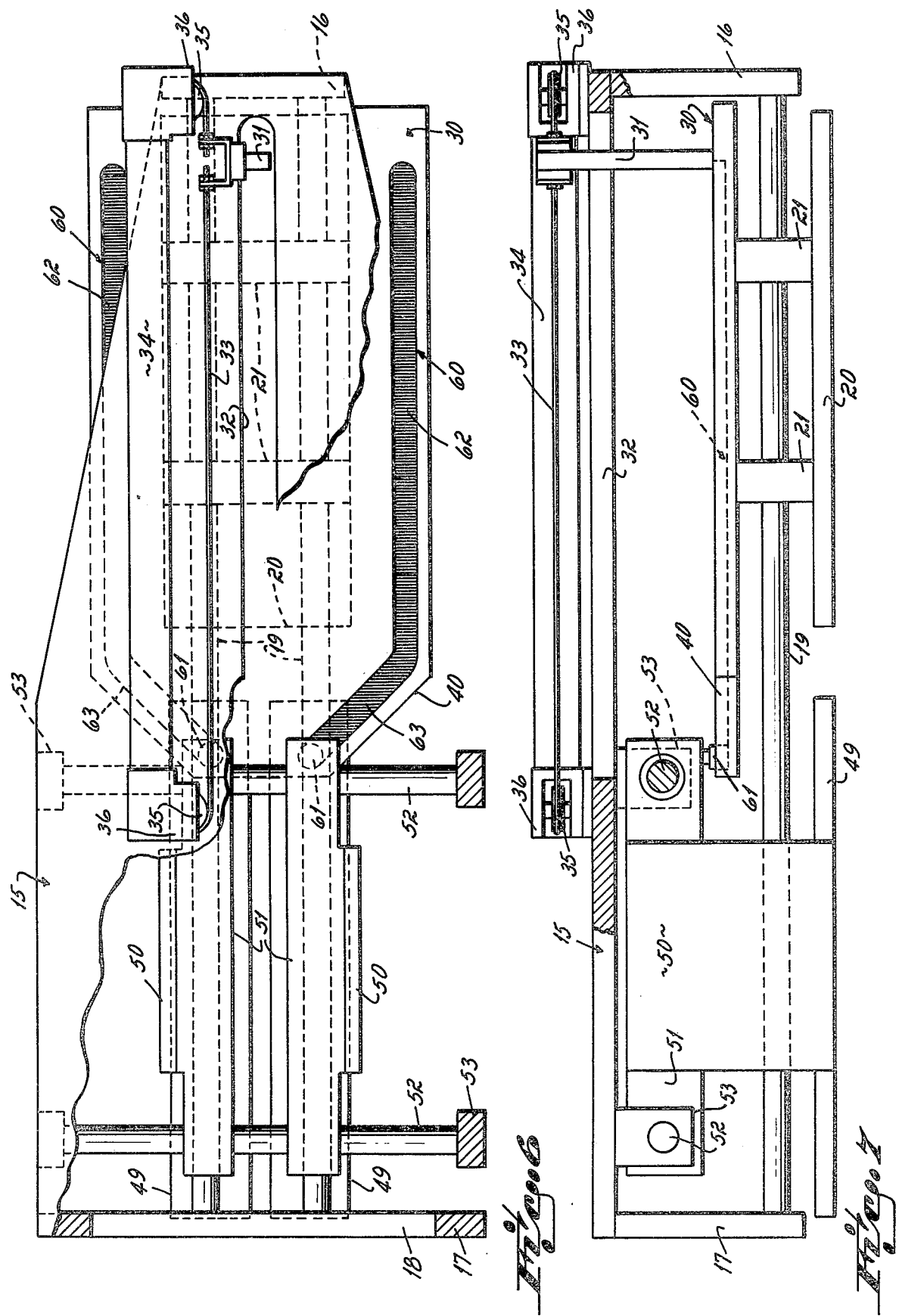

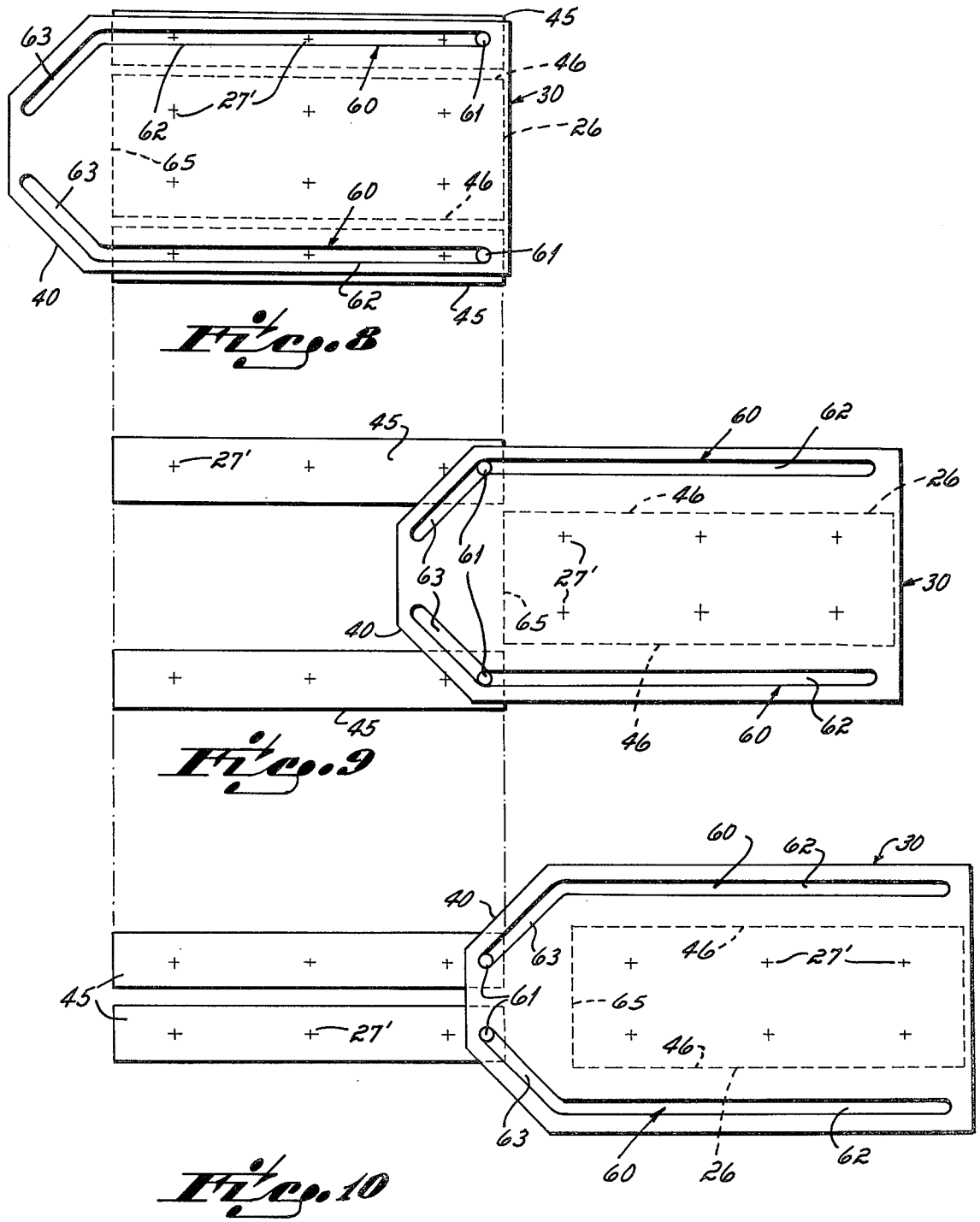

TRANSFER APPARATUS FOR PATTERN-CHANGING MECHANISM

BACKGROUND OF THE INVENTION

This invention relates to apparatus for handling articles and particularly the invention relates to apparatus for rearranging the pattern of articles as they are being transported from one position to another.

The particular environment for which the invention was developed is an uncasing apparatus wherein cases containing patterns of bottles are indexed to a position alongside the apparatus. The apparatus has a carriage containing a pattern of lifting devices and a mechanism for moving the carriage between a position overlying the case and a position overlying a conveyor which carries the uncased bottles off for further processing.

In a case, a typical pattern has four bottles in the transverse direction and three bottles in a longitudinal direction. It is desired to remove that pattern of bottles from each case and deposit the bottles onto a conveyor in a 2×6 pattern, that is, two bottles in a transverse direction and six bottles in a longitudinal direction.

Prior the present invention it had been the practice simply to uncase bottles directly by lifting a 3×4 pattern out of the case and depositing that 3×4 pattern onto a conveyor. The conveyor would carry the 3×4 pattern, or four rows of bottles into expensive and complex combining apparatus wherein the four rows of bottles would be converted to two rows.

It has been an objective of the invention to eliminate the combining machine and operation and to provide transferring apparatus wherein the pattern of 3×4 bottles is converted to a pattern of 2×6 bottles as the bottle lifting carriage moves from the case to the conveyor onto which the bottles are deposited.

The objective of the invention is achieved by providing three carriage parts, namely, a center carriage having a 2×3 pattern of lifting devices and two outboard carriages each having a 1×3 pattern of lifting devices. The outboard carriages are initially positioned along the longitudinal edges of the center carriage thereby creating a 3×4 pattern. A mechanism is provided for moving the center carriage longitudinally with respect to the outboard carriages and a cam and track mechanism is provided to drive the outboard carriages transversely toward each other when the longitudinally moving center carriage passes the outboard carriages.

With this mechanism, when the 3×4 pattern of bottles is gripped by the devices on the respective carriages and lifted out of the case, the center carriage is moved longitudinally during transfer to the conveyor. The motion imparted to the center carriage causes, through the cam and track mechanism, a transverse movement of the outboard carriages. When the shift of carriages has been completed, a 2×6 pattern is achieved.

While the invention is being described as an uncaser wherein a 3×4 pattern is converted to a 2×6 pattern, it should be understood that the mechanism is applicable to other article handling apparatus wherein articles of one pattern are rearranged, during transfer, to another pattern.

The objectives and several features of the invention will become more readily apparent from the following detailed description taken in conjunction with the accompanying drawings in which:

FIG. 4 is a top plan view of the apparatus with a portion of it broken away;

FIG. 5 is a side elevational view, partly in section, of the apparatus;

FIG. 6 is a top plan view similar to that of FIG. 4 with different portions broken away and with the apparatus shifted to a 2×6 pattern;

FIG. 7 is a side elevation of the apparatus of FIG. 6;

FIGS. 8, 9 and 10 are diagrammatic plan views illustrating the manner in which the cam and follower mechanism shifts the carriages with respect to each other.

DETAILED DESCRIPTION OF THE INVENTION

Figure 1:
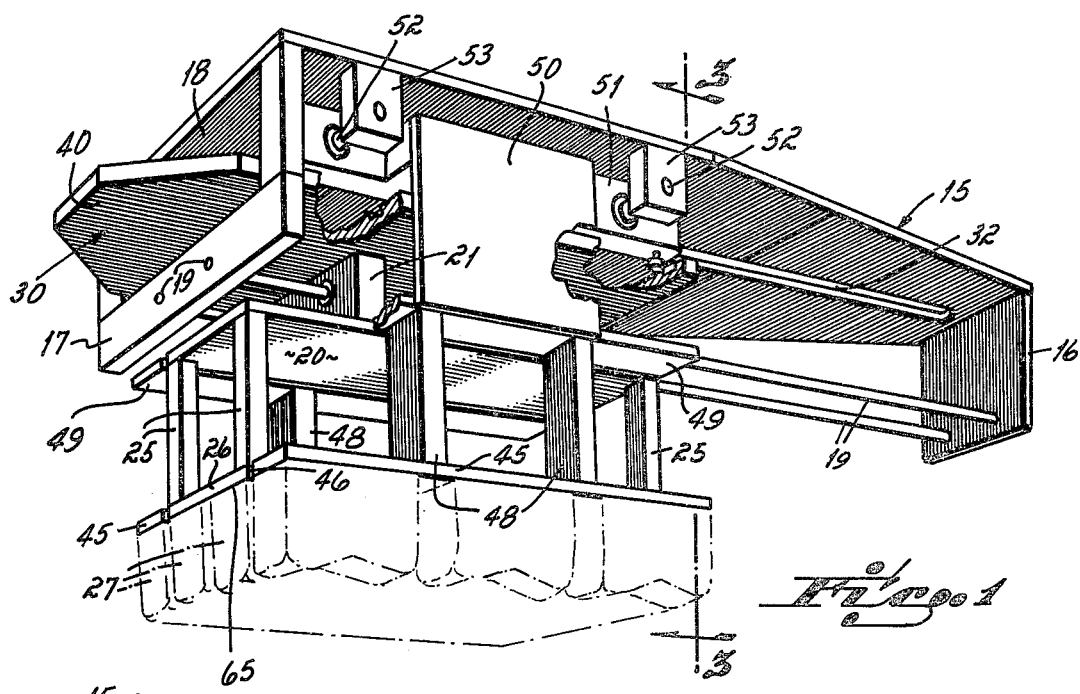
FIG. 1 is a perspective view, partly broken away, of apparatus according to the present invention with lift devices in a 3×4 pattern.

Much of the bottles transferring apparatus is conventional and has not been illustrated since it forms no part of the invention. The omitted apparatus includes a case conveyor and indexing mechanism, a bottle conveyor lying alongside the case conveyor, and apparatus for moving a bottle carriage from the case conveyor to the bottle conveyor during which lifting devices on the bottle carriage grasp the bottles in the cases and thereafter deposit the bottles on the conveyor.

The novel portion of the invention is illustrated in the drawings and consists of the carriages, support structures, and mechanism for shifting the carriages with respect to each other.

Figure 2:
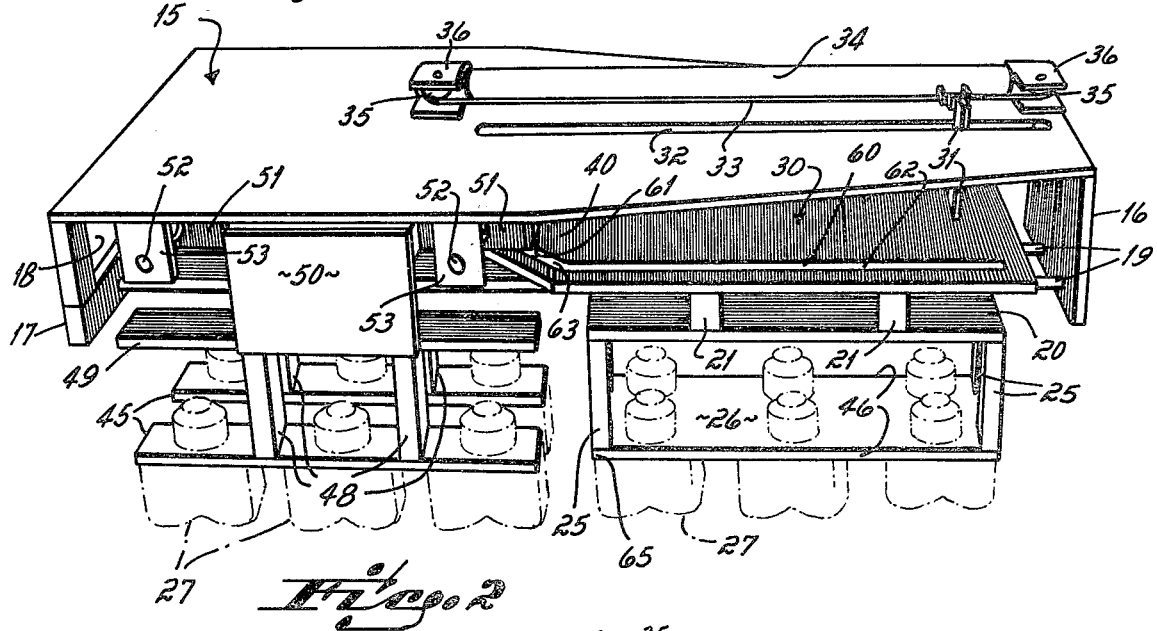
FIG. 2 is a perspective view of the invention with lift devices in a 2×6 pattern.
Figure 3:
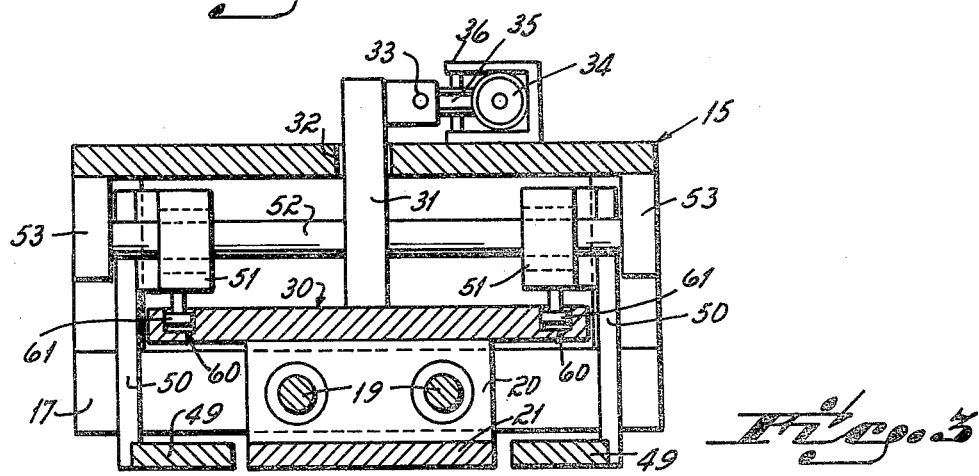
FIG. 3 is a cross-sectional view taken along lines 3—3 of FIG. 1.

Referring particularly to FIGS. 1 and 2, the apparatus of the invention includes a frame 15 having depending brackets 16 on one end and 17 on the other end. The bracket 17 is U-shaped and has an opening 18 whose function will become apparent from the description below.

Two longitudinal support rods 19 extend between the brackets 16 and 17. The longitudinal support rods 19 carry a center support 20 which has two bearing blocks 21 fastened to its upper surface, the bearing blocks being slidable on the rods 19.

Four posts 25 depend from the support 20 and are secured at their lower ends to a center carriage 26. The center carriage 26 has a pattern of 2×3 lifting devices 27 projecting downwardly. The lifting devices 27 are of the type which are projected into a case, each device grasping a bottle in a case cell and retaining the bottle until the bottles are deposited on the conveyor alongside the apparatus. A pneumatic system, not shown, is provided for operating the respective lifting devices to cause them to grasp and release the engaged bottles at the appropriate times.

A part of the center support is a cam plate 30 which is mounted on the top of the bearing blocks 21 and fixed thereto. The cam plate has a vertical post 31 which projects upwardly through a longitudinal slot 32 in the frame 15. The post 31 is connected to a cable 33 forming a part of a cable cylinder 34 within which a double acting piston rides, the double acting piston being connected to the ends of the cable. The cable passes around pulleys 35 at each end of the cylinder 34, the pulleys being mounted in brackets 36 which are fixed to the frame 15.

As the cylinder is actuated by introducing a fluid into one and/or the other, the cam plate 30 is caused to move longitudinally with respect to the frame 15, carrying with it the bearing blocks 21, the center support 20, and the center carriage 26.

The cam plate has a tapered end 40 which projects through the opening 18 in the bracket 17 when the cam plate moves (left as shown in the drawings) to its extreme position toward the bracket 17.

The apparatus has two outboard carriages 45 which normally lie along longitudinal edges 46 of the center carriage 26 (FIG. 1). Each outboard carriage 45 carries a 1×3 pattern of lifting devices 27 similarly connected to a pneumatic operating system. The outboard carriages 45 are connected to depending vertical posts 48 which are fixed to outboard horizontal support plates 49. Support plates 49 are rigidly secured to vertical support plates 50 which are in turn fixed to longitudinally extending bearing blocks 51. The bearing block is slidably mounted on transverse rods 52 supported in bracket 53 which depend from the frame 15. Each bearing block 51 overlies the cam plate 30.

The cam plate 30 has two cam tracks 60 in its upper surface, the cam tracks 60 being engaged by cam followers 61 which are secured to the bearing blocks 51. Each cam track has a longitudinal section 62 and an inwardly angulated section 63 located approximately at the tapered end 40 of the cam plate 30.

OPERATION

The operation of the invention is illustrated in part in FIGS. 8-10. Let it be assumed that the operation began with the apparatus in a 3×4 pattern wherein the outboard carriages lie along the longitudinal edges 46 of the center carriage 26. In this orientation, the apparatus is lowered to project the lifting devices 27 into a case having a 3×4 pattern of bottles and lift that pattern of bottles out of the case. As soon as the bottles are clear of the case, the cylinder 34 is actuated to drive the cam plate 30 toward the right as viewed in the drawings. In the first portion of the movement, up to the position illustrated in FIG. 9, there is no movement of the outboard carriages 45 since the cam followers are simply riding in longitudinal sections 62 of the cam track as can be seen by comparing FIGS. 8 and 9. As the cam plate 30 continues to move in a rightward direction, the cam track causes the cam follower 61 to ride in the inwardly angulated section 63 of the cam track. As that movement begins, the center carriage 26 has just moved past the ends of the outboard carriages 45 so that there is no obstruction blocking movement of the outboard carriages 45 toward the center of the apparatus. At the end of the rightward movement of the cam plate 30 and the center carriage 26, the cam followers 61 have reached their innermost positions on the inwardly angulated track sections 63 and have brought the outboard carriages 45 together adjacent a transverse edge 65 of the center carriage 26.

The center portion of each of the grasping devices is indicated by the symbol + at 27'. By comparing the lifting device positions 27' depicted in FIGS. 8 and 10, it can be seen that the lifting devices move from a 3×4 pattern in FIG. 8 to a 2×6 pattern as shown in FIG. 10.

Reversing the application of fluid to cylinder 34 causes the apparatus to return to the state depicted in FIGS. 1 and 8.

Having described my invention, I claim:

1. In apparatus for transferring articles, a mechanism for reorienting a pattern of articles comprising,
   a support,
   a center carriage suspended from said support, and having transverse and longitudinal edges,
   a pair of outboard carriages of substantially the same length as said center carriage, said outboard carriages being suspended from said support and, in a first position, being located adjacent each longitudinal edge of said center carriage,
   means mounted on said center and outboard carriages for holding articles,
   and means for moving said outboard and center carriages longitudinally with respect to each other and thereafter moving said carriages transversely with respect to each other to shift said outboard carriages from said first position to a second position in which the ends of said outboard carriages are adjacent the transverse edge of said center carriage, thereby bringing said outboard carriages into longitudinal alignment with said center carriage.

2. In apparatus for transferring articles, a mechanism for reorienting a pattern of articles comprising,
   a support,
   a center carriage fixedly mounted on said support, and having transverse and longitudinal edges,
   an outboard carriage mounted adjacent each longitudinal edge of said center carriage,
   means mounted on said center and outboard carriages for holding articles,
   and means for moving said outboard carriages from said longitudinal edges to side-by-side positions adjacent a transverse edge of said center carriage,
   said moving means comprising,
   a pair of cam tracks in said support,
   said outboard carriages having followers riding in said cam tracks,
   means for thrusting said support in a longitudinal direction to carry said center carriage longitudinally with respect to said outboard carriages,
   said cam tracks camming said outboard carriages toward each other when said center carriage has passed said outboard carriages.

3. In apparatus for transferring articles, a mechanism for reorienting a pattern of articles comprising,
   a frame,
   a center support mounted for longitudinal movement on said frame,
   a center carriage mounted on said center support,
   a pair of outboard supports mounted on said frame for transverse movement toward and away from each other,
   a pair of outboard carriages mounted on said outboard supports,
   means mounted on said center and outboard carriages for holding articles,
   means for moving said center support longitudinally,
   a pair of cam tracks on said center support,
   cam followers mounted on said outboard supports and engageable with said cam tracks,
   said cam tracks being oriented to cause said outboard supports to move transversely toward and away from each other when said center support moves longitudinally toward and away from said outboard supports.

4. In apparatus for transferring articles, a mechanism for reorienting a pattern of articles comprising,
   a frame, a center carriage mounted for longitudinal movement on said frame, a pattern of lifting devices mounted on said center carriage, a pair of outboard carriages mounted for transverse movement toward and away from each other, a pattern of lifting devices on each said outboard carriage, means for moving said center carriage longitudinally, means connecting said center carriage to said outboard carriages to impart transverse movement to said outboard carriages when said center carriage is moved, said carriages being movable between a position in which said outboard carriages are adjacent respective longitudinal edges of said center carriage, and a position in which said outboard carriages are adjacent each other and a transverse edge of said center carriage.

5. Apparatus as in claim 4 in which said interconnecting means comprises a cam plate mounted above said center carriage and movable therewith, cam tracks on the surface of said plate and having longitudinal sections and inwardly angulated sections, cam followers connected to outboard carriages and riding in said cam tracks, whereby as said center carriage is moved longitudinally said outboard carriages initially remain stationary until said center carriage is passed, and then as said followers ride in the angulated sections said outboard carriages move inwardly toward each other.

* * * * *